United States Patent
Zappia

[11] 3,835,698
[45] Sept. 17, 1974

[54] TESTER HEAD

[76] Inventor: Anthony T. Zappia, 7576 Ivywood Dr., Apt. A, Indianapolis, Ind. 46250

[22] Filed: Oct. 15, 1973

[21] Appl. No.: 406,278

Related U.S. Application Data

[60] Continuation of Ser. No. 272,692, July 17, 1972, , which is a division of Ser. No. 126,563, March 22, 1971, Pat. No. 3,777,556.

[52] U.S. Cl. .................................................. 73/94
[51] Int. Cl. ........................................... G01n 3/08
[58] Field of Search ................ 73/94; 269/274, 275; 100/295, 153, 156; 198/22 B; 193/1

[56] References Cited
UNITED STATES PATENTS

| | | | |
|---|---|---|---|
| 1,799,019 | 3/1931 | Mischler | 279/123 |
| 2,195,277 | 3/1940 | Kleinman | 100/295 UX |
| 2,195,683 | 4/1940 | Ross et al. | 100/295 UX |

*Primary Examiner*—Jerry W. Myracle
*Attorney, Agent, or Firm*—Hood & Coffey

[57] ABSTRACT

Apparatus for impressing a transaxial crushing force of predetermined value successively upon a series of substantially identical pieces of frangible ware for the purpose of discarding pieces of defective strength, including a pneumatically-loaded presser head in opposed registration with a vertically disposed face of a conveyor or impeller, the same being so disposed that pieces of ware, while being subjected to transaxial pressure, are supported in unstable condition upon a moving platform so that, upon fracture of a piece of ware, substantially all fragments of such piece will fall from the platform, means being provided for cooperation with the upper regions of undamaged ware to support such ware against toppling from the platform. The active face of the presser head is formed of synthetic material, that portion thereof below a level at least equal to the transaxial dimension of a piece of ware above the platform having a coefficient of friction significantly less than that of the portion of the face above that level to facilitate the free movement of a prostrate ware piece past the presser head.

3 Claims, 10 Drawing Figures

TESTER HEAD

This is a continuation of co-pending application Ser. No. 272,692, filed July 17, 1972 for Tester Head which, in turn, was a Division of my application Ser. No. 126,543, now U.S. Pat. No. 3,777,556 filed Mar. 22, 1971 for Air Squeeze Ware Tester.

Hollow glassware, and certain other ware made from frangible material, must be capable of withstanding transaxial pressures up to specified minimums in order to be commercially acceptable; and it is therefore customary for manufacturers to subject such ware to calibrated pressure, whereby substandard ware is shattered and discarded, before delivering the ware. Heretofore, devices for so testing the ware have relied upon spring means for applying the pressure, whereby accurate calibration for containers of various sizes has been impossible. Furthermore, previously-known devices for so testing ware have been relatively complicated and expensive and have been of such construction that fragments of shattered pieces have sometimes entered unbroken containers or have clogged the machinery.

The primary object of the present invention is to provide simple, inexpensive mechanism, readily introduced into a conventional conveyor line, for applying accurately calibrated transaxial pressure to each one of an advancing series of substantially identical articles of frangible ware. A further object of the invention is to provide such a device which is readily shiftable into a position in which the ware will by-pass the pressure-applying means.

Still another object of the invention is to provide such a device which includes means for shifting the ware, as it approaches the pressure-applying means, to an unstable position upon the conveyor means whereby, if any article is broken, all of its fragments will fall away from the mechanism and the conveyor. Another object of the invention is to provide, in connection with such shifting means, guide means cooperative with the upper ends of the pieces to restrain unbroken pieces against falling laterally from the conveyor.

Still another object of the invention is to provide, in connection with such apparatus, means whereby a piece of ware which has fallen into a prostrate position aligned with the direction of movement of the conveyor, will continue to move freely past the squeezing station without clogging the machinery, and will then be discarded from the line.

It is a further object of the invention to provide means whereby such a machine may be readily adapted to handle articles of various shapes, sizes and contours.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 2:
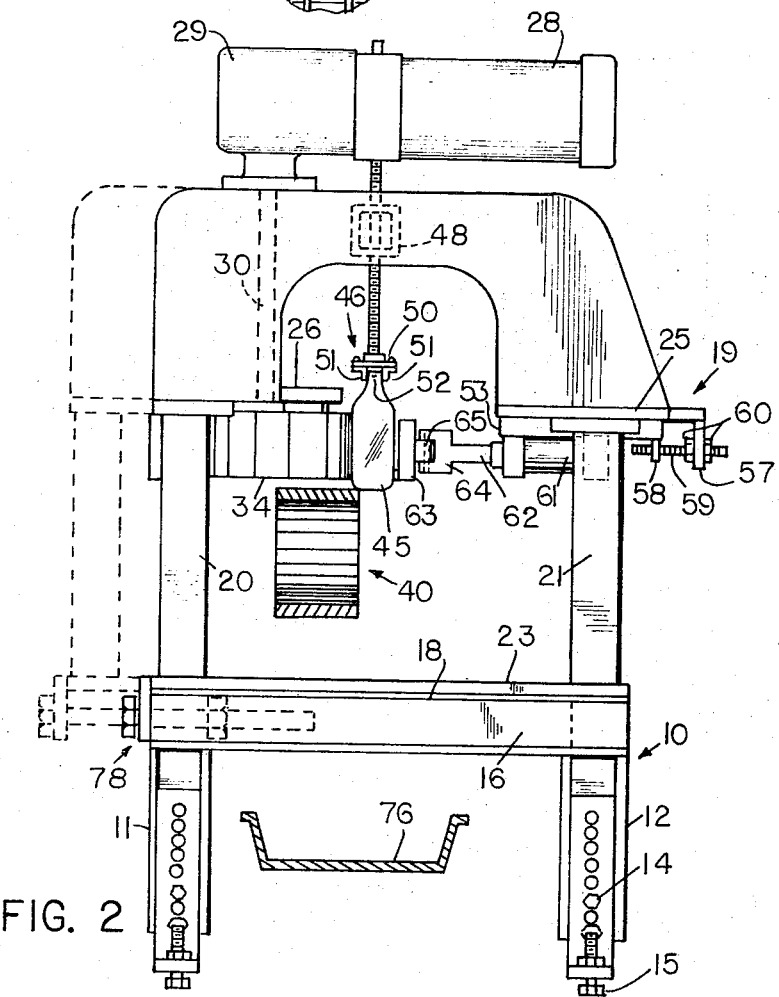
FIG. 2 is an end elevation of the same as viewed from the bottom of FIG. 1.
Figure 7:
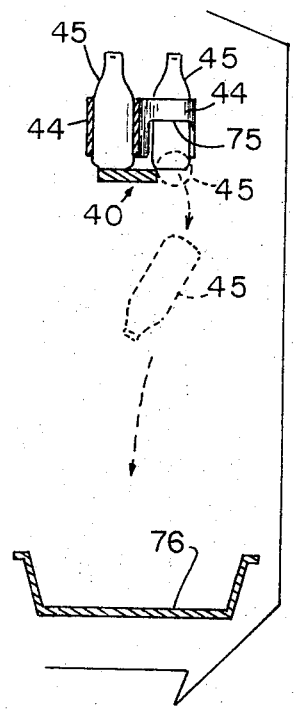
FIG. 7 is a fragmentary view illustrating means whereby such a prostrate piece will be discarded from the traveling line of ware.
Figure 3:
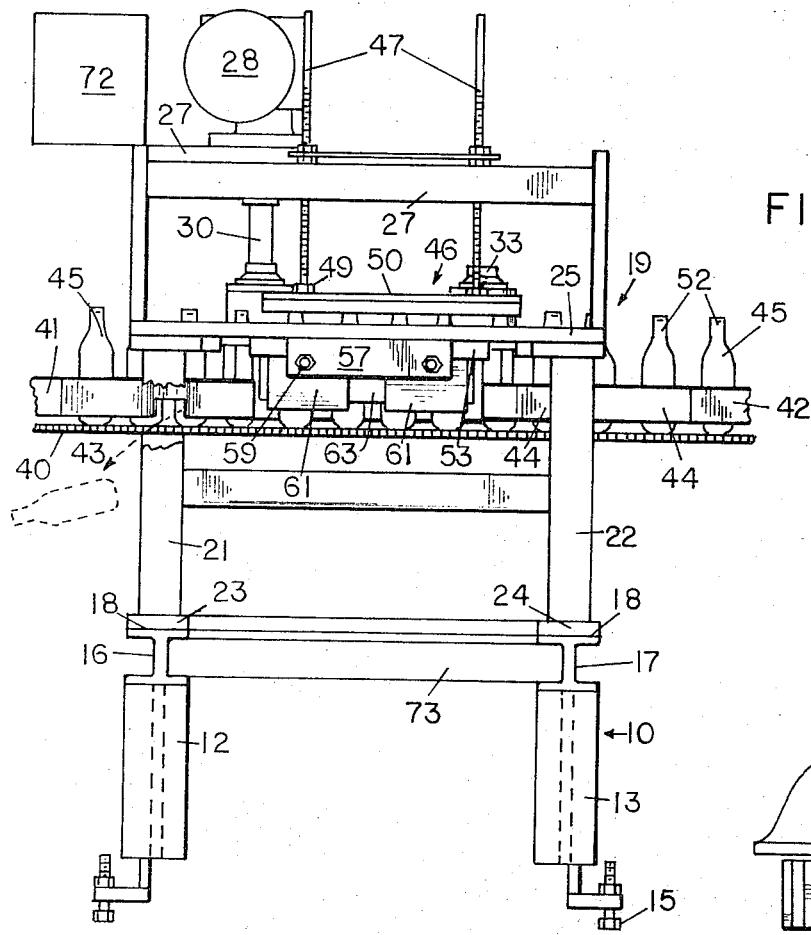
FIG. 3 is a side elevation taken from the right of FIG. 1.

Referring more particularly to the drawings, it will be seen that the illustrated embodiment of my tester includes a base frame indicated generally by the reference numeral 10 comprising four upstanding legs, three of which, 11, 12 and 13, are illustrated in FIGS. 2 and 3. Each leg includes rough adjustment means 14 and fine adjustment means 15 whereby a beam 16 spanning and joining the upper ends of legs 11 and 12, and a beam 17 spanning and joining the upper ends of leg 13 and the unillustrated leg, may be leveled so that their upwardly-presented surfaces 18, 18 will lie in a common, horizontal plane. Beams 16 and 17 may be joined as by spanners 73.

The tester comprises further an auxiliary frame indicated generally by the reference numeral 19. Four upstanding legs, three of which are illustrated at 20, 21 and 22, are adapted to register substantially with legs 11, 12 and 13, and the unillustrated leg, of the base frame 10. The legs 20 and 21 are supported from a slide rail 23, slidably mounted on the surface 18 of the beam 16, while the leg 22 and the unillustrated leg are supported from a similar slide rail 24 mounted to slide on the surface 18 of the beam 17. Thus, it may be conceived that the legs 21 and 22 constitute a first laterally-spaced pair while the leg 20 and the unillustrated leg constitute a second laterally-spaced pair.

A horizontal table 25 is supported from the leg pair 21–22 and a separate but coplanar table 26 is supported from the second leg pair. An upper shelf 27 supports the driving motor 28 which, through a speed varying device 29 of any kind is connected to drive a vertical shaft 30 which carries and directly drives a pulley or sprocket 31. A similar pulley or sprocket 32 is supported, in a common horizontal plane with the sprocket 31, upon a shaft 33 whose axis is parallel with the shaft 30; and a continuous belt conveyor 34 is trained about the sprockets 31 and 33.

In the optimum form, as illustrated, the conveyor comprises a pair of endless roller chains 35 and a series of blocks 37 each of which is formed, on its inner surface, with a pair of transverse sockets 36 receiving the chains 35 and secured thereto on the axes of the chain rollers. The outer surface of each block 37 carries a pad 38 of rubberoid or other frictional material. In the space between the sprockets 31 and 32, there are mounted back-up shoes 39, 39 bearing respectively, upon the inner surfaces of the active and inactive runs of the conveyor belt 34.

Figure 1:
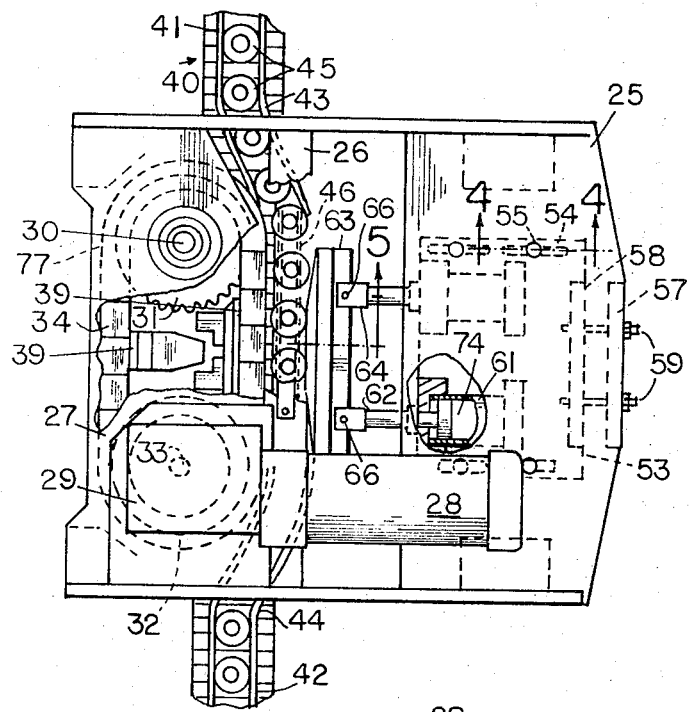
FIG. 1 is a plan view of an air squeeze ware tester constructed in accordance with the present invention, parts being broken away for clarity of illustration.

In FIGS. 1 and 2, I have illustrated a rectilinear fragment of a conventional, continuous belt conveyor 40. A conventional guideway 41, cooperative with the base portions of a continuous series of pieces of ware 45 movable on the conveyor 40 extends from a supply location (not shown) to a point near the entry side of the tester, while a similar guideway 42 extends from a point near the exit side of the tester to a delivery point. An S-shaped section 43 of similar guide means extends from the terminus of the section 41 to a point near the active run of the conveyor 34; and a similar S-shaped section 44 extends from a point near the exit end of the conveyor 34 into registry with the guideway section 42. It will be seen, upon inspection of FIGS. 1 and 2, that guideway sections 41 and 42 are substantially centered relative to the platform or carrying surface of the conveyor 40, while the guideway sections 43 and 44 will cause advancing pieces of ware to move laterally relative to the conveyor 40 to an unstable position hanging over one edge of the conveyor 40, and thence back to a stable position.

Between the adjacent ends of the guideway sections 43 and 44 there is arranged a second guide means 46 adapted to cooperate with the upper ends of the pieces of ware 45 moving between the guideway sections 43 and 44. Said guide means 46 comprises a pair of screws 47 threadedly mounted in a frame element 48 for vertical adjustment and supporting, through swivel connections 49, a plate or bar 50 which closely overlies the open upper ends of ware pieces 45 as they pass between the adjacent ends of the guideway sections 43 and 44. Depending from the bar 50 and supported therefrom for adjustment toward and away from each other are the lips 51 which straddle the upper regions (for instance, the finish 52 of a bottle) of the articles 45 to hold them against lateral tilting.

Figure 4:
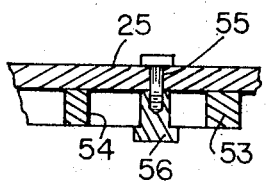
FIG. 4 is an enlarged, fragmentary sectional view taken substantially on the line 4—4 of FIG. 1.

A plate 53 is adjustably supported from the lower surface of the table 25. As is most clearly to be seen in FIGS. 1 and 4, each end of the plate 53 is formed with a pair of aligned, elongated slots 54. For each such slot, the table 25 is penetrated by a screw 55 whose shank receives a headed nut 56, the shank of said nut being guidingly received in the corresponding slot and the head thereof spanning its associated slot, whereby said plate is supported. It will be clear that the threaded engagement between the screw 55 and its nut 56 will clamp the plate 53 in any selected position of adjustment and that, upon loosening such threaded connection, the plate 53 may be adjusted toward and away from the active run of the conveyor 40.

As is most clearly to be seen in FIG. 2, a flange 57 depends from the terminal edge of the table 25 and a similar flange 58 depends from the adjacent end of the plate 53. Two parallel screws 59 are operatively engaged between the flanges 57 and 58 for shifting the plate 53. As shown, the screws are threaded through the flange 57 and have swivel connections with the flange 58; and lock nuts 60 may be threaded on the screws 59 for clamping engagement on opposite sides of the flange 57 to maintain any selected position of adjustment of said screws.

Figure 5:
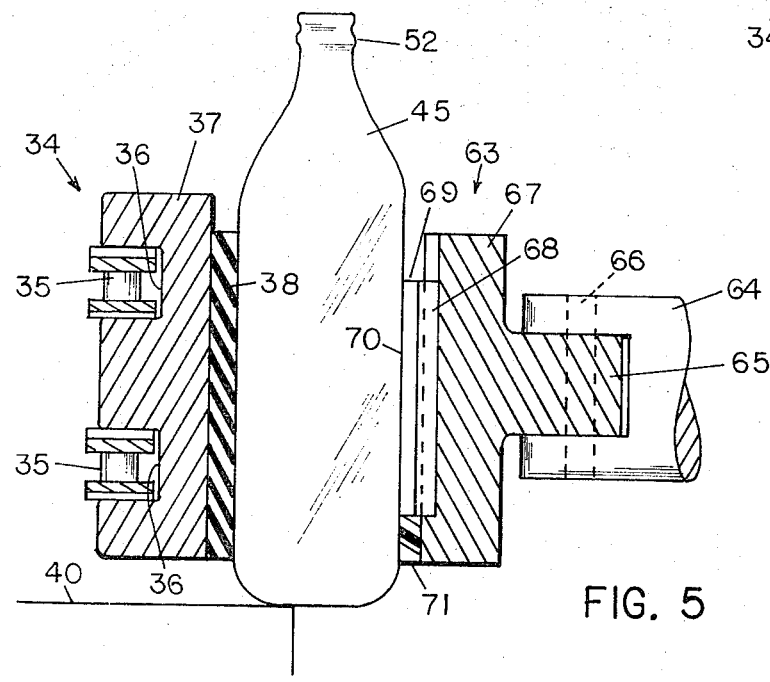
FIG. 5 is an enlarged, fragmentary, sectional view, taken substantially on the line 5 of FIG. 1.

Two fluid motors 61, 61 are fixedly secured upon parallel axes to the lower surface of the plate 53. Each such motor, of course, includes a cylinder and a piston 74 reciprocable therein. Piston rods 62 project through corresponding ends of the motors 61 to support a presser head 63. As shown and preferably, each piston rod carries a clevis 64 (FIGS. 1 and 5) constructed and arranged to straddle a flange 65 of a base member 67, the clevises being secured to said flange by pivot pins 66 disposed upon axes parallel with the working surface of the active run of the conveyor 34.

A block 68 is suitably carried on that face of the base 67 remote from the flange 65, and a pad 69 of synthetic material is fixed to said block and presents a friction surface 70 toward the friction pads 38 of the blocks 37 of the conveyor 34, said surface 70 being generally parallel to the friction surfaces of the pads 38. Preferably, however, the opposite end regions of the pad surface 70 will retreat from the plane of the pads 38 as is clearly shown in FIG. 1, to facilitate entry of ware pieces between the pads 38 and 69, and departure therefrom.

For a purpose which will appear hereinafter, it is desirable that the lower region of the pad 69 shall have a coefficient of friction significantly less than that of the upper, major region of the pad. I have found that sheet urethane is a highly satisfactory material for the major portion of the pad 69, but that the lower region 71 should preferably be formed of a low-friction material such as Teflon.

Figure 6:
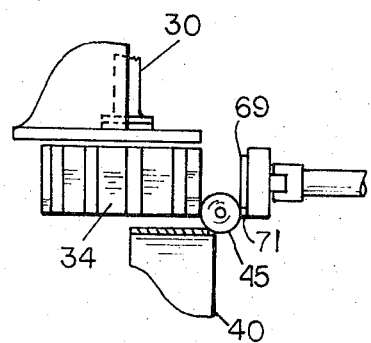
FIG. 6 is a fragmentary view illustrating means for facilitating travel of a ware piece in prostrate position past the presser head.

The upward extent of the region 71 should be at least equal to the radius of the maximum transverse section of the ware pieces 45 being tested. Thus, if a ware piece should fall on the conveyor, so that it lies prostrate with its axis extending in the direction of travel of the conveyor 40, as suggested in FIG. 6, it will continue to travel freely with said conveyor with minimum frictional resistance to such travel. It will be clear that, so long as the ware pieces stand with their axes vertical, they will be urged to rotate upon their axes, not only by the force exerted against their sides by the traveling pads 38, but also by the frictional drag exerted upon them by the major areas of the pad 69. When, however, a ware piece falls into the prostrate position of FIG. 6, any frictional drag exerted by the presser head 63 would tend to resist movement of the piece under the influence of the conveyor 34; and the provision of the low-friction strip 71 obviates that tendency.

A control panel or box for the mechanism is suggested at 72 in FIG. 3. When the tester is to be used, the legs 21 and 22 are removed, carrying with them the table 25 and the presser head assembly including the plate 53 and the motors 61. Now, the machine is brought to a selected rectilinear portion of the conveyor 40 and is moved, from left to right as viewed in FIG. 1, into a position in which the conveyor 34 largely overlies the conveyor 40 with the active, vertical surface of the conveyor 34 disposed just above the upper surface of the conveyor 40 and close to the inner edge of the latter. Now, the legs 21 and 22 and their supported mechanism will be replaced. Guide sections 41 and 42, sized for supporting and guiding association with the lower regions of the ware to be processed are associated with the conveyor 40 and suitable guide sections 43 and 44 are also installed. The lips 51 of guide means 46 will be adjusted so that they will barely clear the upper regions of the ware to be processed, and screws 47 are adjusted to bring the plate or bar 50 to a level which will barely clear the upper extremities of the ware to be processed.

Now, the plate 53 will be adjusted by manipulation of the screws 59 to bring the surface 70 into a position spaced from the pads 38 by a little less (perhaps one-eighth inch) than the diameter of the ware pieces when the pistons 74 are fully advanced, and the plate 53 is suitably locked or clamped in that position.

Now, the driving motors for the conveyors 40 and 34 are energized, and the speed varying means 29 is adjusted so that the longitudinal speed of the conveyor 34 is preferably slightly greater than that of the conveyor 40; and ware pieces 45 are fed to the conveyor 40 at the above-mentioned remote source of supply.

Ware pieces will travel, substantially centrally located, upon the conveyor 40 until they encounter the guide means section 43 whereby, as they advance, they will be shifted laterally until they overhang the inner edge of the conveyor 40, at which time their upper ends attain cooperative association with the lips 51 of the guide means 46. At about this point, each ware piece will come into contact with the pads 38 of the active run of the conveyor 34. Thus, the conveyor 40 and the conveyor 34 cooperate to introduce the ware pieces successively to the inclined surface at the end of the presser head pad 69. It will be understood, of course, that gas (preferably air) under pressure of preselected value will have been introduced into the proximal ends of the cylinders 61 to press the pistons 74 into their limiting positions of projection of the head 63. As a ware piece enters between the conveyor 34 and the presser head 63, first one and then the other piston will be pushed toward the right as viewed in FIG. 1 until they occupy substantially the position suggested in that figure. Thereby, the presser head will exert upon the ware pieces a force tending to crush the ware pieces, the degree of such force being dependent upon the controlled pressure of the gas supplied to the motors 61. It will be appreciated, of course, that the force so applied to the ware will remain constant, regardless of the degree of movement of the pistons 74, since the pressure within the motors 61 will remain constant at the supply value.

It will be appreciated, of course, that the presser head 63 is disposed in opposing registration with the active run of the conveyor 34 and that the back-up shoe 39 sustains the pressure which will be exerted by the presser head against the ware pieces 45 as they pass the testing station. The degree of pressure so exerted upon the ware will depend directly upon the pressure at which air, for instance, is supplied to the right-hand ends of the cylinders 61, since the plate 53 is adjusted to conform to the diameter of the ware pieces being tested in such fashion that, when at least one piece of ware is disposed between the active run of the conveyor 34 and the presser head 63, the pistons 74 will be backed away from the adjacent ends of their cylinders.

So long as every piece of ware passing the presser head 63 is sufficiently strong to withstand the selected pressure applied thereto, ware will move sedately and without incident along the conveyor 40 past the testing station and to the remote end of conveyor 40. If, through some mishap, a piece of ware should topple into the position suggested in FIG. 6, it will be carried smoothly in its prostrate position past the presser head 63 to a point at the ingress end of the guideway section 44, where that section is formed with a cutout 75 in the lower edge of its outer rail, sized to permit a prostrate piece to pass therethrough and roll off the outer edge of the conveyor 40 to drop into the pan, chute, conveyor or the like 76. It is necessary, of course, to reject a piece of ware which has passed the tester in such a condition because it has not been subjected to the test pressure in the proper way. Pieces thus rejected, and which are not damaged when so rejected may, of course, be salvaged from among the fragments deposited in the pan 76, to be rerouted through the tester at a later time.

When a defectively weak piece of ware is subjected to test pressure, it will be smashed. Its upper region will thus be withdrawn from the guide means 46 and, because the piece was located in an unstable position on the conveyor 40, the fragments will all fall away from that conveyor and into the pan 76 for discard.

If desired, a stiff-bristled brush (not shown) may be mounted upon the auxiliary frame 19 with its bristles bearing upon the outer surface of the return run 77 of the conveyor 34 to remove any fragments which may adhere to the blocks 37.

If, on occasion, it should be desired to refrain from subjecting a particular run of ware to the squeeze test, the guideway sections 43 and 44 may be removed, the legs 21 and 22 with the table 25 and its suspended parts may be removed, and the auxiliary frame 19 may be bodily shifted to the position illustrated in broken lines in FIG. 2. Thereby, the conveyor 34 will be removed from its overlying relationship to the conveyor 40, a straight section (not shown) of guideway may be inserted to connect sections 41 and 42, the guideway 46 may be elevated to inoperative position and thereafter, of course, ware may be moved along the conveyor 40 without being subjected to the squeeze test and without interference by the parts of the ware tester disclosed herein.

Suitable means of any desired character may, if desired, be provided for shifting the frame 19 relative to frame 12 and/or for retaining the same in any position of adjustment, such a means being indicated by the reference numeral 78 in FIG. 2. When, thereafter, it is desired to restore the tester to service, return of the auxiliary frame 19 to its original registry with the main frame 10 will, of course, reestablish the original relationship of the tester parts to the conveyor 40.

Figure 8:
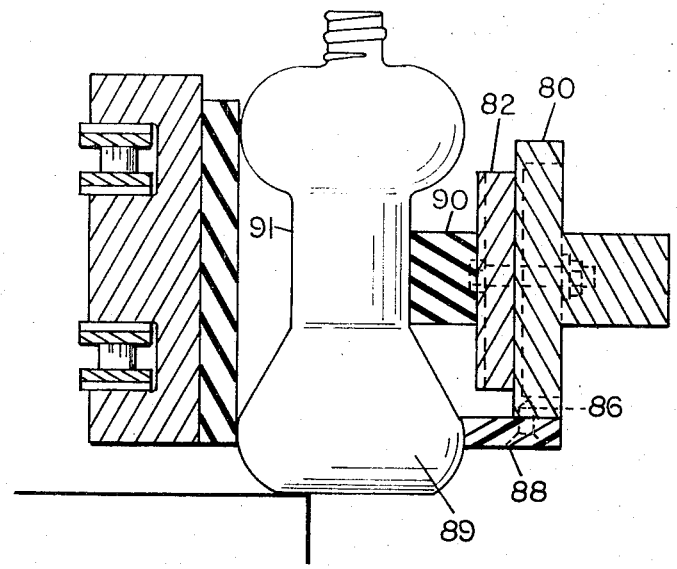
FIG. 8 is a view similar to FIG. 5 but showing a modified form of presser head associated with a bottle of "fancy" configuration.
Figure 9:
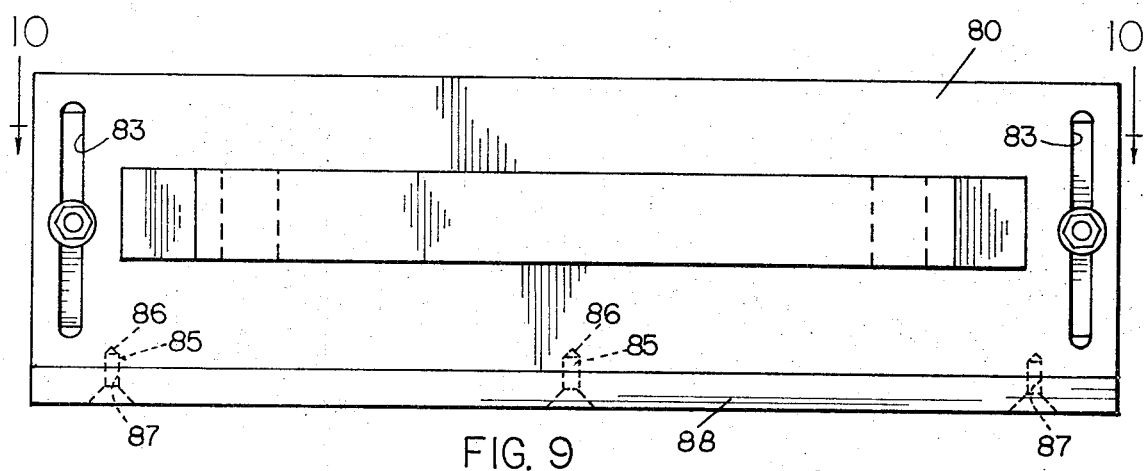
FIG. 9 is an elevation taken from the right of FIG. 8.
Figure 10:
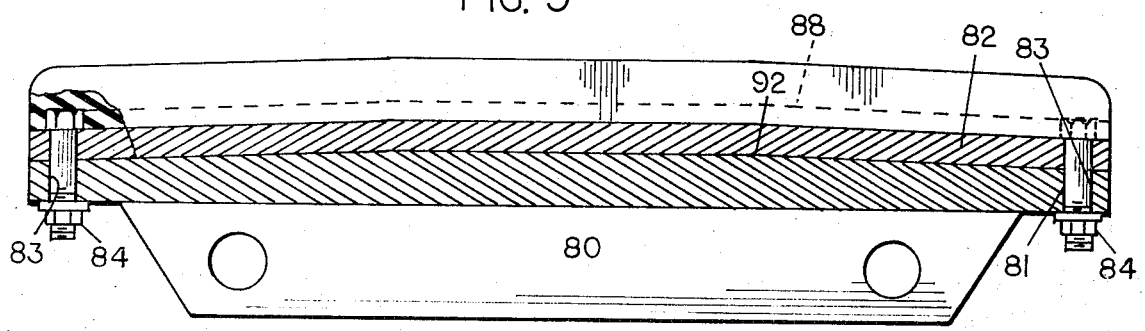
FIG. 10 is a top plan view of the presser head of FIG. 9, shown partly in horizontal section.

In FIGS. 8 to 10, I have illustrated a modified form of presser head designed to facilitate adaptation of the tester to bottles or other containers of unconventional contour. The reference numeral 80 indicates a base which is functionally similar to the base 67 of FIG. 5. However, the base is formed, adjacent its opposite ends, with vertically elongated slots 83, 83 which receive screws 81, 81 projecting from the rearward face of a block 82 and nuts 84 threaded onto the screws 81 are effective to retain the block 82 in any selected position of vertical adjustment relative to the base 80. A pad 90 of synthetic material similar to that of the pads 69 is bonded to the forward face of the block 82 and is suitably contoured to bear upon a selected surface, such as the waist 91, of the bottle 89 illustrated in FIG. 8 to exert test pressure upon that selected portion of the article's surface. As shown, the lower edge of the base 80 may be provided with tapped holes 85 to receive screws 86 passing through holes 87 in a Teflon pad 88, constructed and designed to bear upon another surface of the bottle 89 and to serve the purpose of the strip 71 of FIG. 5.

Obviously, the adjustable mounting of the block 82 on the base 80 inherently affords flexibility in the use of the presser head assembly with various shapes of ware. Thus, a manufacturer may maintain a supply of block-and-pad elements which may be selectively used with a base 80 for cooperation with various stock sizes and shapes of ware to be tested.

In this form of presser head, the taper or retreat at the opposite ends of the presser head may be achieved by curving the face 92 of the cast base 80 and bending, or even flexing, the block 82 and the pad 90 to conform to that curve, thus avoiding the necessity of forming the pad to varying thicknesses. Obviously, the same expedient may be used in the assembly illustrated in FIG. 5.

I claim as my invention:

1. The combination with backer means, of a presser head supported for movement toward and away from said backer means, said head comprising a base, a block secured to said base, and pad means of synthetic material secured to said block to provide a substantially vertical surface facing said backer means, the major, upper portion of said pad means having a coefficient of friction significantly higher than that of the minor, lower portion of said pad means, and means yieldably urging said head toward said backer means.

2. The combination of claim 1 in which said pad means is supported for vertical adjustment relative to said base.

3. The combination of claim 1 in which said block is supported for vertical adjustment relative to said base.

* * * * *